United States Patent [19]

Uchida

[11] Patent Number: 5,407,073
[45] Date of Patent: Apr. 18, 1995

[54] FLOPPY DISK CONTAINER
[75] Inventor: Hiromichi Uchida, Tokyo, Japan
[73] Assignee: Toyo Chemical Co., Ltd., Tokyo, Japan
[21] Appl. No.: 130,458
[22] Filed: Oct. 1, 1993
[51] Int. Cl.$^6$ .................. B65D 85/30; B65D 85/57
[52] U.S. Cl. .................. 206/308.3; 206/309; 206/804; 206/312
[58] Field of Search .............. 206/309, 310, 311, 312, 206/444, 454, 455, 804, 815

[56] References Cited

U.S. PATENT DOCUMENTS

| | | | |
|---|---|---|---|
| 3,908,824 | 9/1975 | Takahara et al. | 206/815 |
| 3,942,639 | 3/1976 | Cournoyer et al. | 206/309 |
| 4,415,079 | 11/1983 | Ackeret | 206/455 |
| 4,588,321 | 5/1986 | Egly | 206/444 |
| 4,639,813 | 1/1987 | Uno | 206/444 |
| 4,687,101 | 8/1987 | Barker, Sr. et al. | 206/312 |
| 4,691,826 | 9/1987 | Ozeki | 206/454 |
| 4,736,837 | 4/1988 | Brainard | 206/444 |
| 4,850,731 | 7/1989 | Youngs | 206/311 |
| 5,031,772 | 7/1991 | Woodriff | 206/444 |
| 5,048,681 | 9/1991 | Henkel | 206/312 |

Primary Examiner—Paul T. Sewell
Assistant Examiner—Marie Denise Patterson
Attorney, Agent, or Firm—Wenderoth, Lind & Ponack

[57] ABSTRACT

A floppy disk container comprises a container body and and a plate member for preventing upward release of a floppy disk. The container body has its back side provided with a member for securing it to a file or the like, and it also has a floppy disk accommodation surface provided with ribs for supporting the floppy disk in a raised state. The floppy disk container itself thus can be attached to a file or the like to facilitate floppy disk arrangement. Further, the floppy disk, which has its take-out portion supported in a state raised from the floppy disk accommodation surface, can be taken out readily and smoothly.

4 Claims, 4 Drawing Sheets

FLOPPY DISK CONTAINER

BACKGROUND OF THE INVENTION

One prior art floppy disk container is a protective case which comprises a case body and a plate member hinged to one side of the case body. The sole main object of this protective case is to protect the floppy disk.

Therefore, although the protective case is produced rigidly and accurately to meet its purpose, it is mostly discarded after purchase. In present floppy disk management, several floppy disks taken out from the protective case are accommodated side by side in a floppy disk container for management and storage.

However, where a plurality of floppy disks are accommodated in a floppy disk container and taken out from the same as required, more storage space than is necessary is provided, and it is not easy to retrieve and take out the floppy disks. That it has been very difficult to take out a desired floppy disk quickly and smoothly.

Further, it is very uneconomical that the rigidly and accurately produced floppy disk container like the protective case noted above is mostly discarded without being utilized in any way after purchase.

SUMMARY OF THE INVENTION

Accordingly, it is an object of the invention to provide a floppy disk container which has various functions, such as a conventional protective case and excellent retrieval properties permitting a desired floppy disk to be found quickly, as well as permitting ready and smooth take-out of floppy disks.

BRIEF DESCRIPTION OF THE DRAWINGS

FIG. 4 is a front view showing the floppy disk container according to the invention attached to a file or the like.

DETAILED DESCRIPTION OF THE PREFERRED EMBODIMENTS

Figure 1:
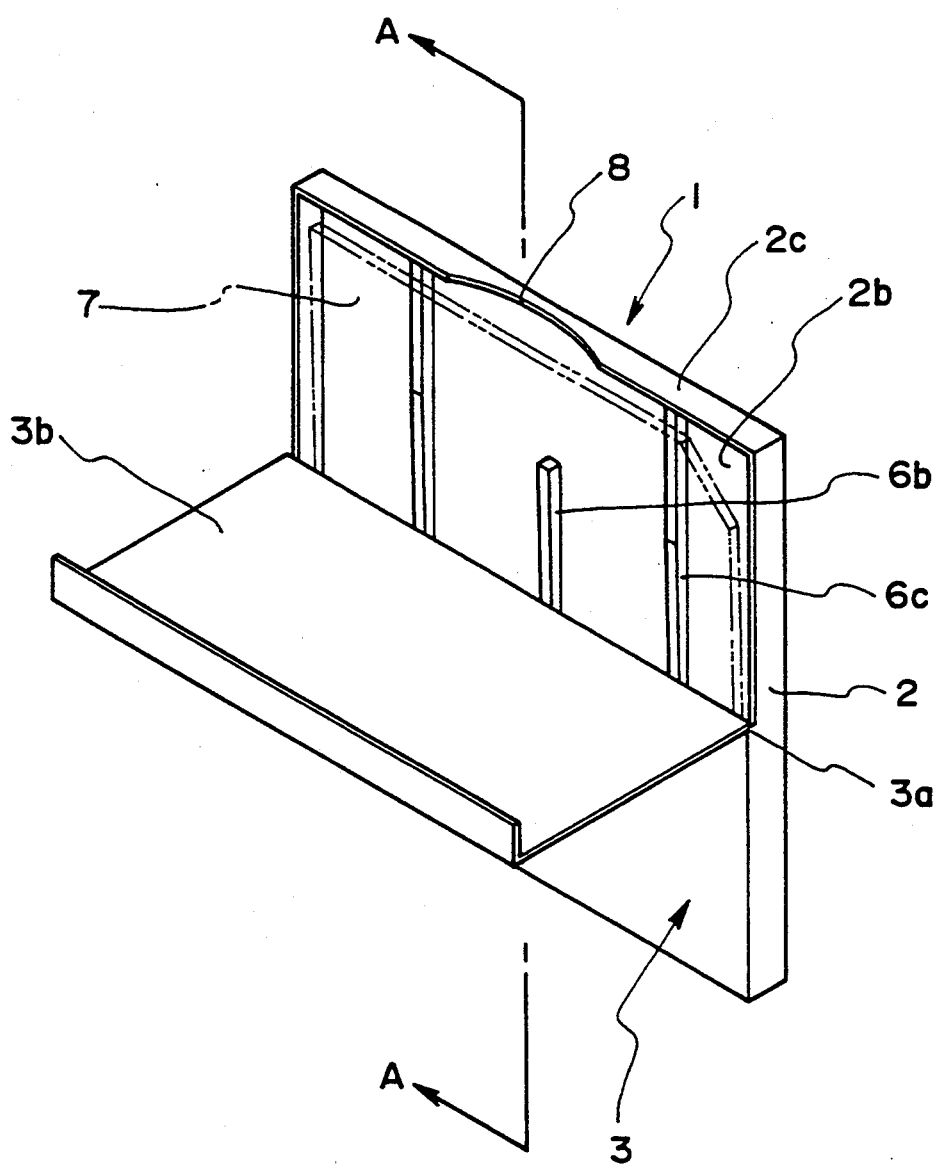
FIG. 1 is a perspective view showing a floppy disk container embodying the invention.
Figure 2:
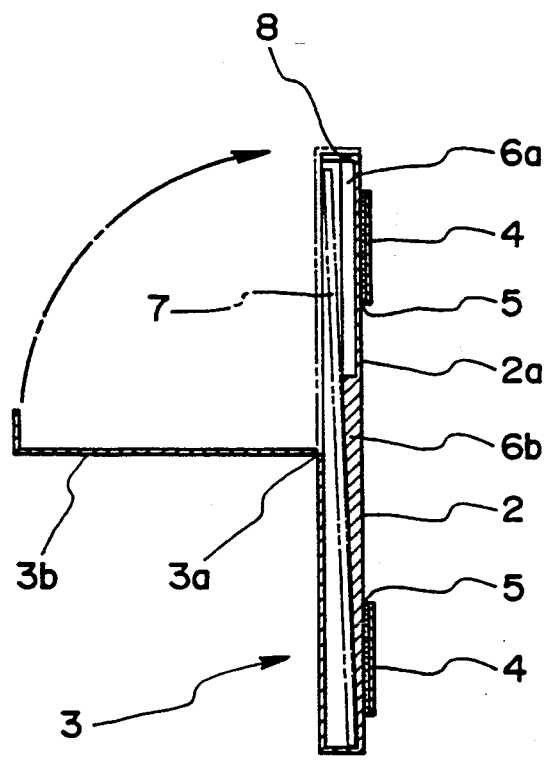
FIG. 2 is a sectional view taken along line A—A in FIG. 1.
Figure 3:
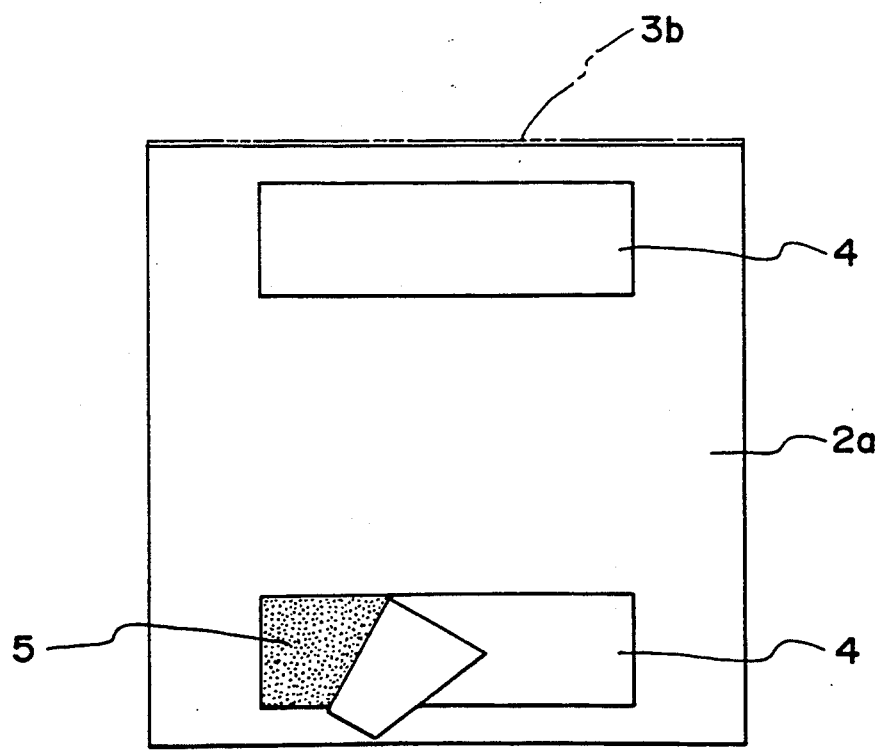
FIG. 3 is a back view showing the floppy disk container according to the invention.

FIG. 1 shows a floppy disk container 1 according to the invention, comprising a container body 2 and a plate member 3.

This floppy disk container body 2 has double-sided adhesive tapes 5 with releasable paper 4, which are applied to a back surface 2a of the container body 2. The plate member 3 has an intermediate hinge line 3a, about which a floppy disk take-out portion 3b of the plate member 3 can be folded back against the container body 2.

Figure 5:
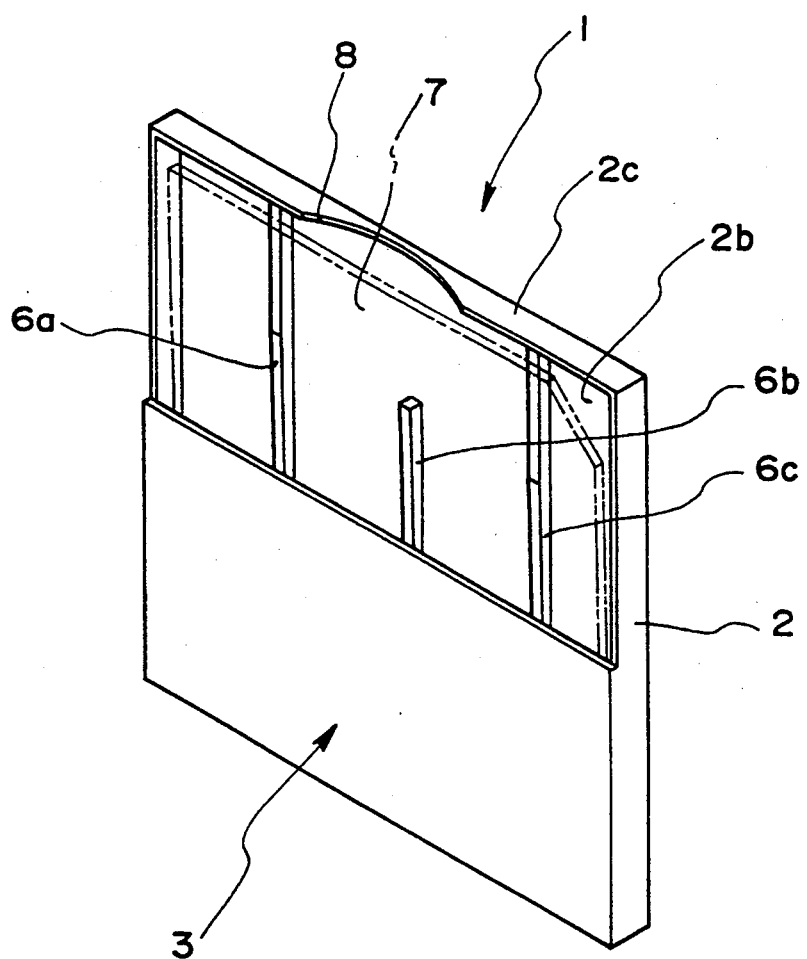
FIG. 5 is a perspective view showing a different embodiment of the invention.

In case a local plate member can prevent the upward release of floppy disks, as shown in FIG. 5, the floppy disk take-out portion 3b of the plate member 3 may be removed to provide a top opening.

This embodiment permits prevention of the detachment of the floppy disk and also permits very quick and smooth accommodation and take-out thereof.

The floppy disk container has a floppy disk accommodation surface 2b provided with a plurality of ribs 6a to 6c. In this embodiment, the central rib 6b extends from a bottom floppy disk accommodation end up to an intermediate position in the direction of floppy disk removal, and it has a taper such that its height is increased gradually as one goes in the direction of floppy disk removal.

The left and right ribs 6a and 6c extend from the floppy disk accommodation end up to the floppy disk removal end, and they have a taper such that their height is increased gradually up to an intermediate portion as one goes in the direction of floppy disk removal.

Thus, an accommodated floppy disk 7 is supported on the ribs 6a to 6c such that they are raised from the floppy disk accommodation surface 2b and that it can be readily taken out with a finger touching its take-out end portion.

The container body 2 has an end wall 2c in the floppy disk take-out direction formed with a notch 8 to permit smoother removal of the floppy disk.

Figure 4:
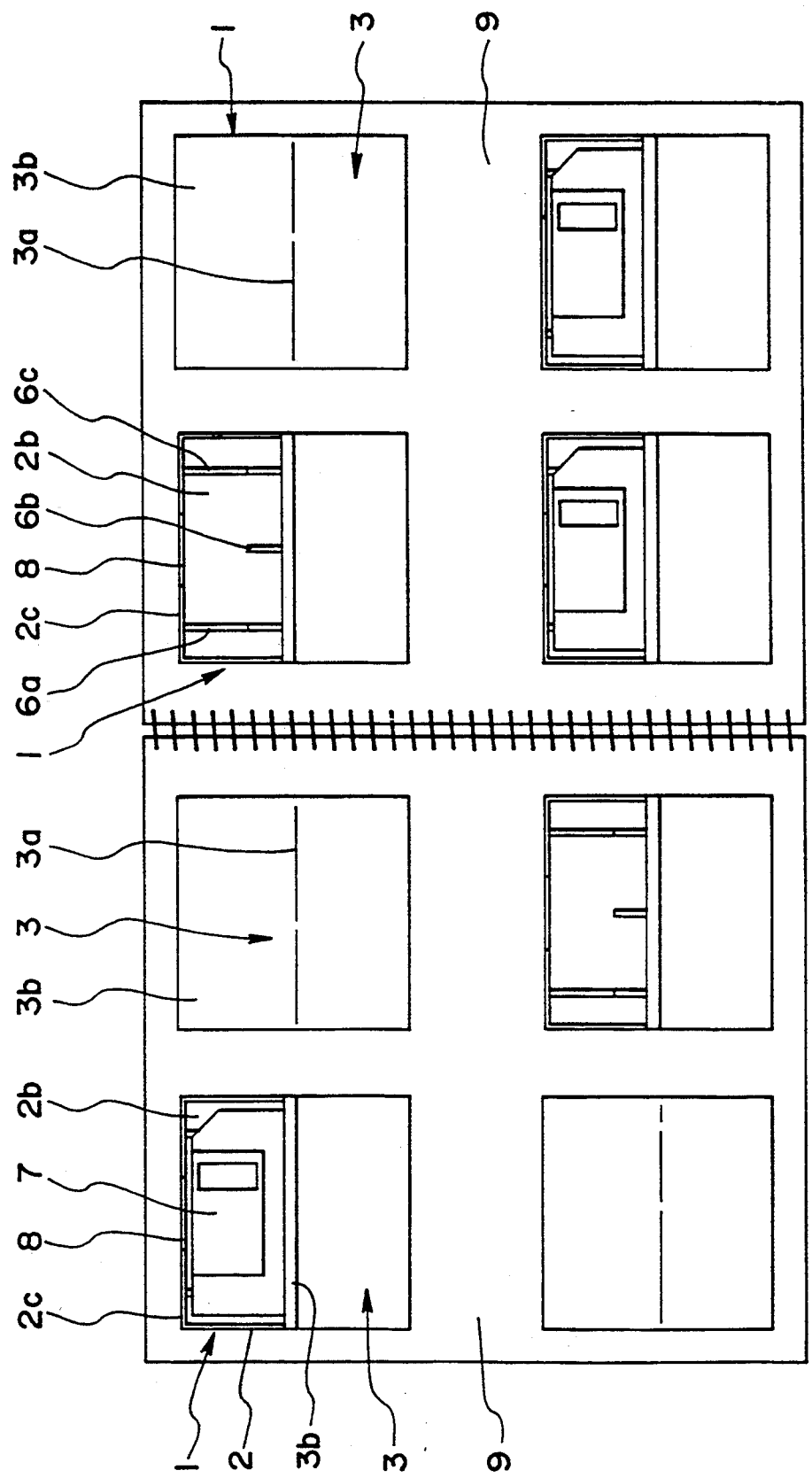

The floppy disk container 1 having the above structure, with the accommodated floppy disk, can be neatly applied, by utilizing the back side double-sided adhesive tapes 5, to a support sheet 9 of a file or the like, as shown in FIG. 4, such that it can be readily retrieved and, unlike the case of storage in a storage box, it takes no substantial space.

When it is desired to take out the floppy disk, by opening the plate member 3 it can be very readily and smoothly taken out with a finger, because its take-out end portion is raised from the floppy disk accommodation surface 2b by the ribs 6a to 6c, and also the notch 8 is formed in the end wall of the container body 2.

Further, since the plate member 3 has a hinge line 3a, which is formed at an intermediate position, and about which the floppy disk take-out portion 3b of the plate member can be folded and unfolded for opening and closing, or where a floppy disk take-out portion is removed to form the top opening as shown in FIG. 5, the floppy disk is prevented from upward detachment and can be taken out and accommodated smoothly with a finger.

Further, unlike the prior art floppy disk protective case, which is discarded after purchase, the floppy disk container according to the invention can be utilized even after the purchase. That is, the floppy disk container according to the invention can be filed neatly with the adhesive means while providing the function of floppy disk protection, instead of the prior art storage means in which a plurality of floppy disks are accommodated in a storage box stored in a desk, and thus take storage space, which dictates time for the retrieval of desired floppy disks and which is inferior in its retrieval properties.

Desired floppy disks thus can be found instantly from a file without feeling any inconvenience of in time consumption for their retrieval.

Besides, the floppy disk can be taken out quickly and smoothly from the floppy disk container. The floppy disk container thus meets all the requirements for it.

What is claimed is:

1. A floppy disk container, comprising:
   a container body having a back surface with an attachment member thereon, a floppy disk accommodation surface, a bottom end and an upper disk removal end, said floppy disk accommodation surface having at least one raised rib thereon for supporting a floppy disk raised above said floppy disk accommodation surface, and said at least one raised rib having a taper such that the height of said at least one rib above said floppy disk accommodation surface increases gradually from said bottom end toward said upper disk removal end;

a plate member attached to said container body covering at least part of said floppy disk accommodation surface to prevent loss of a floppy disk from said container body; and a peripheral wall on the periphery of and upstanding from said container body, said peripheral wall having a portion at the upper end of said container body having a floppy disk removal notch therein, and said plate member being fixed to said peripheral wall above said floppy disk accommodation surface;

wherein said at least one raised rib comprises three raised ribs, two of said ribs having upper ends that do not taper, and the third of said ribs having no upper end and being positioned between the other two of said ribs below said floppy disk removal notch.

2. The floppy disk container of claim 1, wherein said plate member comprises a lower portion fixed to said container body and an upper portion hinged to said lower portion and capable of being opened and closed over said floppy disk accommodation surface.

3. The floppy disk container of claim 1, wherein said plate member is fixed to said container body and covers a lower portion of said floppy disk accommodation surface, leaving an upper portion of said floppy disk accommodation surface uncovered.

4. The floppy disk container of claim 1, wherein said attachment member comprises double-sided adhesive tape.

* * * * *